(12) United States Patent
Wagoner et al.

(10) Patent No.: US 10,411,473 B2
(45) Date of Patent: *Sep. 10, 2019

(54) POWER CONVERTER FOR ENERGY SYSTEMS

(71) Applicant: General Electric Company, Schenectady, NY (US)

(72) Inventors: Robert Gregory Wagoner, Roanoke, VA (US); Govardhan Ganireddy, Bangalore (IN); Saurabh Shukla, Clifton Park, NY (US); Rajni Kant Burra, Clifton Park, NY (US); Ravisekhar Nadimpalli Raju, Clifton Park, NY (US); Rui Zhou, Niskayuna, NY (US); Rajib Datta, Niskayuna, NY (US); John Leo Bollenbecker, Albany, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 173 days.

This patent is subject to a terminal disclaimer.

(21) Appl. No.: 15/399,001

(22) Filed: Jan. 5, 2017

(65) Prior Publication Data

US 2018/0191166 A1  Jul. 5, 2018

(51) Int. Cl.
*H02J 3/38* (2006.01)
*H02J 7/00* (2006.01)
(Continued)

(52) U.S. Cl.
CPC ............. *H02J 3/383* (2013.01); *H02J 3/386* (2013.01); *H02J 7/0068* (2013.01); *H02M 7/49* (2013.01);
(Continued)

(58) Field of Classification Search
CPC ................................ H02J 3/383; H02M 5/458
See application file for complete search history.

(56) References Cited

U.S. PATENT DOCUMENTS

| 5,719,758 A | 2/1998 | Nakata et al. |
| 8,659,178 B2 | 2/2014 | Arlaban Gabeiras et al. |
| (Continued) | | |

FOREIGN PATENT DOCUMENTS

| CN | 105680488 A | 6/2016 |
| EP | 2290799 A1 | 2/2011 |
| EP | 2 621 076 A1 | 7/2013 |

OTHER PUBLICATIONS

Islam et al., "Power Converters for Small- to Large-Scale Photovoltaic Power Plants", Power Converters for Medium Voltage Networks, Chapter 2, Springer-Verlag Berlin Heidelberg 2014, pp. 17-49.
(Continued)

*Primary Examiner* — Jeffrey M Shin
(74) *Attorney, Agent, or Firm* — Dority & Manning, P.A.

(57) ABSTRACT

Power converters for use in energy systems are included. For instance, an energy system can include an input power source configured to provide a low voltage direct current power. The energy system can include a power converter configured to convert the low voltage direct current power provided by the input power source to a medium voltage multiphase alternating current output power suitable for provision to an alternating current power system. The power converter can include a plurality conversion modules. Each conversion module includes a plurality of bridge circuits. Each bridge circuit includes a plurality of silicon carbide switching devices coupled in series. Each conversion module is configured to provide a single phase of the medium voltage multiphase alternating current output power on a line bus of the energy system.

20 Claims, 5 Drawing Sheets

(51) Int. Cl.
H02M 7/49 (2007.01)
H02M 7/797 (2006.01)
H02M 1/00 (2006.01)

(52) U.S. Cl.
CPC .... *H02M 7/797* (2013.01); *H02M 2001/0058* (2013.01); *H02M 2001/0077* (2013.01); *Y02B 70/1483* (2013.01); *Y02B 70/1491* (2013.01); *Y02E 10/563* (2013.01); *Y02E 10/763* (2013.01)

(56) References Cited

U.S. PATENT DOCUMENTS

| 8,736,102 | B1* | 5/2014 | Gao | H02M 3/28 |
| | | | | 307/17 |
| 9,587,626 | B2 | 3/2017 | Sadaba et al. | |
| 2013/0279228 | A1* | 10/2013 | Zhu | H02M 3/1584 |
| | | | | 363/132 |
| 2015/0070939 | A1* | 3/2015 | Gupta | H02J 3/36 |
| | | | | 363/17 |
| 2016/0016479 | A1* | 1/2016 | Khaligh | B60L 11/1812 |
| | | | | 363/17 |
| 2016/0352230 | A1 | 12/2016 | Norimatsu et al. | |

OTHER PUBLICATIONS

Foureaux, N., et al., "Application of solid state transformers in utility scale solar power plants," IEEE 40th Photovoltaic Specialist Conference (PVSC), p. 1, (Jun. 2014) (Abstract).

Hui, W., et al., "Development and applicability analysis of intelligent solid state transformer," 4th International Conference on Electric Utility Deregulation and Restructuring and Power Technologies (DRPT), p. 1, (Jul. 2011) (Abstract).

Shojaei, A., "Design of Modular Multilevel Converter-based Solid State Transformers," Department of Electrical and Computer Engineering, pp. 1-102 (Nov. 2014).

International Search Report and Written Opinion issued in connection with corresponding PCT Application No. PCT/US2017/067771 dated Apr. 16, 2018.

Baron et al., Breaking the 34.5kV Standard, Drawing on hydro experience, Acciona extols use of 12kV collection system to lower energy costs through elimination of step-up transformers, Wind Systems Magazine, Apr. 2013, pp. 48-54.

Olonso Sadaba et al., Wind Generation Control Strategies for Grid Integration Acciona Windpower Experience, ResearchGate, Acciona Windpower, S.A., uploaded 2015, 11 Pages. https://www.researchgate.net/publication/267966410.

* cited by examiner

POWER CONVERTER FOR ENERGY SYSTEMS

FIELD OF THE INVENTION

The present subject matter relates generally to renewable energy sources, and more particularly to power converter topologies for energy systems.

BACKGROUND OF THE INVENTION

Energy systems, such as energy storage systems and/or solar power generation systems have become increasingly used to deliver power to utility grids either as part of standalone energy storage systems or as part of a renewable energy farm (e.g. a wind farm or solar farm). For instance, energy storage systems can include one or more battery banks or other energy storage devices that can be coupled to an AC power system (e.g. electrical grid) via a suitable power converter. Energy storage systems have the ability to both deliver and reserve energy for particular grid services.

Figure 1:
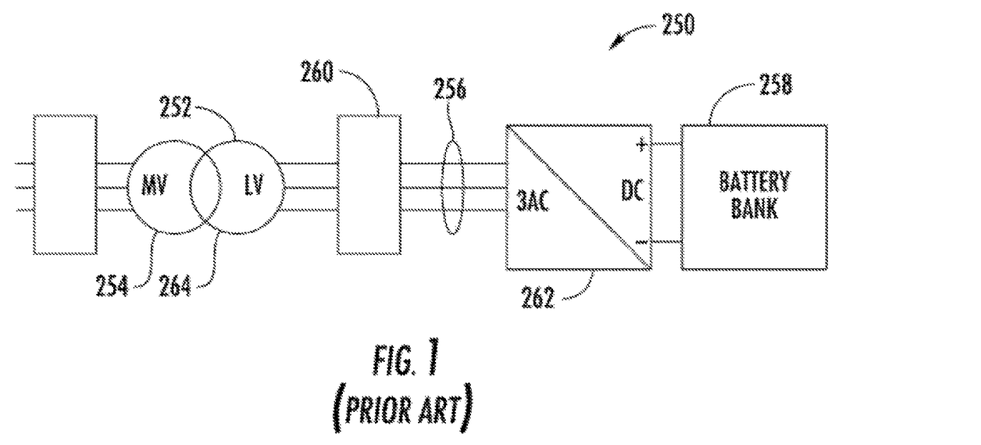
FIG. 1 depicts an example energy storage system.

A typical energy system (e.g. energy storage system, solar power generation system, etc.) includes a two-winding transformer having a medium voltage primary (e.g. 6 KVAC, 12 KVAC, etc.) and a low voltage secondary (e.g. 575 VAC, 690 VAC, etc.) to couple the energy system to the electrical grid. As used herein, the term "low voltage" can refer to voltages less than or equal to 1.5 kV, and the term "medium voltage" can refer to voltages greater than 1.5 kV and less than 100 kV. For instance, FIG. 1 depicts an example energy storage system 250 having such two-winding transformer 252. As shown, a medium voltage primary winding 254 of the transformer 252 can be coupled to the medium voltage AC power system. A line bus 256 can provide AC power to and from a power converter 262 that can be coupled to a low voltage secondary winding 264 of the transformer 252 either directly or via one or more breakers, fuses, switches, etc. (e.g. breaker 260). In the system 250, the output power of a battery bank 258 and the output power of the power converter 262 can be used to charge or discharge the battery bank 258 depending on the direction of power flow to or from the AC power system. The output power of the power converter 262 and the output power of the battery bank 258 can be operated at the same or similar voltage. For instance, the output power of the power converter 262 and the output power of the battery bank 258 can both be operated at low voltage levels.

Such transformers can be used to increase the low voltage provided by the power converter via the line bus to a medium voltage suitable for output to the AC power system. However, the transformers can be costly and can have a considerable effect on the overall size of the energy system.

BRIEF DESCRIPTION OF THE INVENTION

Aspects and advantages of embodiments of the present disclosure will be set forth in part in the following description, or may be learned from the description, or may be learned through practice of the embodiments.

One example embodiment of the present disclosure is directed to an energy system. The energy system includes an input power source configured to provide a low voltage direct current power. The energy system further includes a power converter configured to convert the low voltage direct current power provided by the input power source to a medium voltage multiphase alternating current output power suitable for provision to an alternating current power system. The power converter includes a plurality conversion modules. Each conversion module includes a plurality of bridge circuits. Each bridge circuit includes a plurality of silicon carbide switching devices coupled in series.

Another example aspect of the present disclosure is directed to a power converter for use in an energy system. The energy system includes an input power source configured to provide a low voltage direct current power. The power converter includes a plurality of conversion modules. Each conversion module includes a plurality of bridge circuits. Each bridge circuit includes a plurality of silicon carbide switching devices coupled in series. The power converter is configured to convert the low voltage direct current power provided by the input power source to a medium voltage multiphase alternating current output power suitable for provision to an alternating current power system. Each conversion module is configured to provide a single phase of the medium voltage multiphase alternating current output power on a line bus of the energy system.

Yet another example aspect of the present disclosure is directed to a power conversion system including a plurality of conversion modules. Each conversion module includes a plurality of bridge circuits and an isolation transformer coupled to at least two of the bridge circuits. Each bridge circuit includes a plurality of switching devices coupled in series. The power converter is configured to convert a low voltage direct current power provided by one or more energy storage devices associated with an energy storage system to a medium voltage multiphase alternating current output power suitable for provision to an alternating current power system. Each conversion module is configured to provide a single phase of the medium voltage multiphase alternating current output power on a line bus associated with the power conversion system.

Variations and modifications can be made to these example aspects of the present disclosure.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Example aspects of the present disclosure are directed to power converters for use in energy systems. In particular, example aspects of the present disclosure are directed to power converters capable of converting a low voltage (LV) direct current (DC) voltage to a medium voltage (MV) alternating current (AC) voltage. An energy system can include an energy storage system, and/or an energy generation system such as a solar power generation system. A power converter can be used to couple an input power source (e.g. energy storage device(s), PV array(s), etc.) to an AC power system, such as for instance, an electrical grid. The power converter can include a plurality of bridge circuits. Each of the bridge circuits can include a pair of switching devices coupled in series with one another. For instance, in some implementations, at least a subset of the switching devices can be silicon carbide (SiC) metal-oxide-semiconductor field-effect transistors (MOSFETs). In some implementations, at least a subset of the switching devices can be insulated gate bipolar transistors (IGBTs). The bridge circuits can be controlled, for instance using gate timing commands provided to the switching devices, to provide a desired output to the AC power system (e.g. electrical grid).

According to example aspects of the present disclosure the power converter can include a plurality of power conversion modules. Each power conversion module can be associated with a single phase of a multiphase (e.g. three-phase) AC power. In this manner, the number of power conversion modules can correspond to the number of phases in the multiphase AC power. Each power conversion module can include one or more module branches. The module branches can include a plurality of bridge circuits coupled in parallel. The module branches can further include an isolation transformer coupled to at least a subset of the bridge circuits. The module branches can be coupled to each other in parallel on a LV side of the conversion module, and in series on a MV side of the conversion module.

In particular, the module branches can be configured to convert a LV DC input power to a MV AC output power, or vice versa. For instance, the SiC MOSFETs can be switched at a sufficient frequency to allow for small scale isolation transformers to be implemented within each of the module branches. The isolation transformers can be configured as step-up or step-down transformers depending on the direction of the flow of power through the module branches. More particularly, the transformer winding facing the MV side of the module branch can have a greater number of turns than the transformer winding facing the LV side of the module branch. The particular configurations of the transformers can be selected based at least in part on the grid voltage and/or the voltage provided by the energy storage device(s) and/or PV array(s).

Each module branch contributes to at least a portion of the MV AC output. In this manner, the number of module branches in each conversion module can be determined based at least in part on a desired AC output. In some implementations, the conversion modules can be replaceable units, such that the power converter can be implemented in a modular manner by adding or removing the conversion module units as desired. For instance, the conversion modules can be configured as individual units capable of being selectively coupled to the power converter through one or more interface components. In this manner, a technician or user of the energy system can add or remove the modules by coupling the modules to the system via the interface components.

Implementing power converters in accordance with example aspects of the present disclosure within such energy systems can allow the power converter to be coupled to the AC power system (e.g. electrical grid) without the need for a transformer (e.g. a 50 Hz transformer of 60 Hz transformer) to convert the AC power provided by the power converter to a MV power suitable for the electric grid. In this manner, the 50/60 Hz transformer can be replaced by smaller, lower frequency transformers in each module branch. Such smaller module branch transformers can allow for an overall reduction in size of the energy system. In addition, the use of SiC MOSFETs as switching devices in the power converter can increase an efficiency of the power converter via increased switching frequencies and reduced switching losses relative, for instance, to IGBT switching devices. It will be appreciated that any suitable high frequency switching device can be used to provide the increased switching frequencies.

Figure 2:
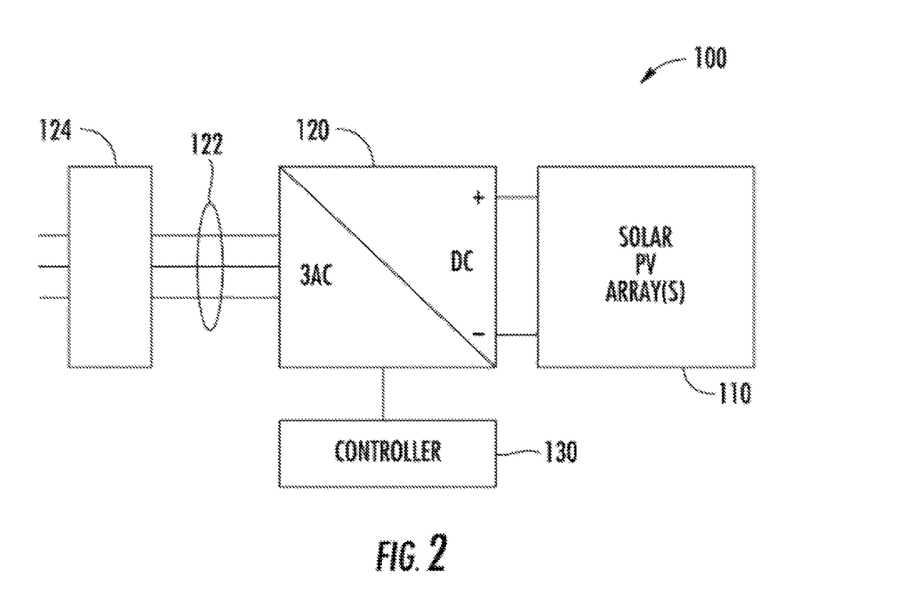
FIG. 2 depicts an example solar power generation system according to example embodiments of the present disclosure.

With reference now to the figures, example aspects of the present disclosure will be discussed in greater detail. For instance, FIG. 2 depicts an example solar power generation system 100. The solar power generation system 100 includes a power converter 120 used to convert DC power generated by one or more PV array(s) 110 into multiphase (e.g. three-phase) AC power suitable for feeding to an AC power system. In particular, the power converter 120 can be configured to convert a LV DC power provided by the PV array(s) 110 into a MV AC power suitable for feeding to the AC power system. As will be discussed in greater detail with reference to FIG. 3, the power converter 120 can include a plurality of conversion modules. Each conversion module can be associated with a single phase of the multiphase AC power provided by the power converter 120. Each conversion module can include a plurality of bridge circuits having a plurality of switching devices coupled in series. In some implementations, the switching devices can include SiC switching devices and/or other suitable switching devices (e.g. IGBT switching devices).

Solar power generation system 100 includes a controller 130 that is configured to control various components of the solar power generation system 100, including the power converter 120. For instance, the controller 130 can send commands to the power converter 120 to regulate the output of the power converter 120 pursuant to a control method that regulates the duty cycle of switching devices (e.g. SiC MOSFETs or other power electronic devices) used in the power converter 120. The modulation commands control the pulse width modulation provided by switching devices to provide a desired real and/or reactive output by the power converter 120. The controller 130 can also be used to control various other components, such as circuit breakers, disconnect switches, and other devices to control the operation of the solar power generation system 100. The controller 130 can include any number of suitable control devices, such as a processor, a microcontroller, a microcomputer, a programmable logic controller, an application specific integrated circuit or other control device.

PV array(s) 110 include a plurality of interconnected solar cells that produce DC power in response to solar energy incident on the PV array(s). The PV arrays 110 are coupled the power converter 120 through a positive input line 102 and a negative input line 103. The positive input line 102 can include a disconnect switch or circuit breaker that is used for coupling and decoupling the PV array(s) 110 from the power converter 120. The controller 130 can be configured to control the opening and closing of the switch to couple and decouple the PV array(s) 110 from the power converter 120.

As indicated, the power converter 120 has a plurality of switching devices that can include one or more power electronic devices such as SiC MOSFETs. The switching devices of the power converter 120 control the flow of the DC power provided by the PV array(s) 110. In particular embodiments, controller 130 controls the power flow by sending gate timing commands to the SiC MOSFET switching devices used in the power converter 120. In certain embodiments, the power converter 120 uses pulse-width modulation (PWM) to synthesize a MV AC output voltage at an AC grid frequency. The output of the power converter 120 can be controlled by controller 130 by providing gate timing commands to the SiC MOSFETs according to well-known PWM techniques. The output AC power from the power converter 120 can have components at the PWM chopping frequency and the grid frequency. The output of the power converter 120 can be provided to the AC power system via a line bus 122 of the solar power generation system 100.

Various circuit breakers and switches, such as grid breaker 124 can be included in the system 100 for isolating the various components as necessary during connection to and disconnection from the AC power system. In this manner, such components can be configured to connect or disconnect corresponding buses, for example, when current flow is excessive and can damage components of the energy system 100 or for other operational considerations. Additional protection components can also be included in the energy system 100, such as one or more additional breakers, one or more fuses, one or more lockout tagout devices, etc.

The controller 130 can be configured to monitor various aspects of the solar power generation system 100. Various current sensors and voltage sensors can be used to monitor the voltage and current of the components of the solar power generation system 100. For instance, current shunts and/or Hall effect sensors can be used to monitor various currents throughout the solar power generation system 100. The controller 130 can control various other aspects of the energy system 120, such as one or more switches, circuit breakers, and/or other components based on the measured parameters.

Figure 3:
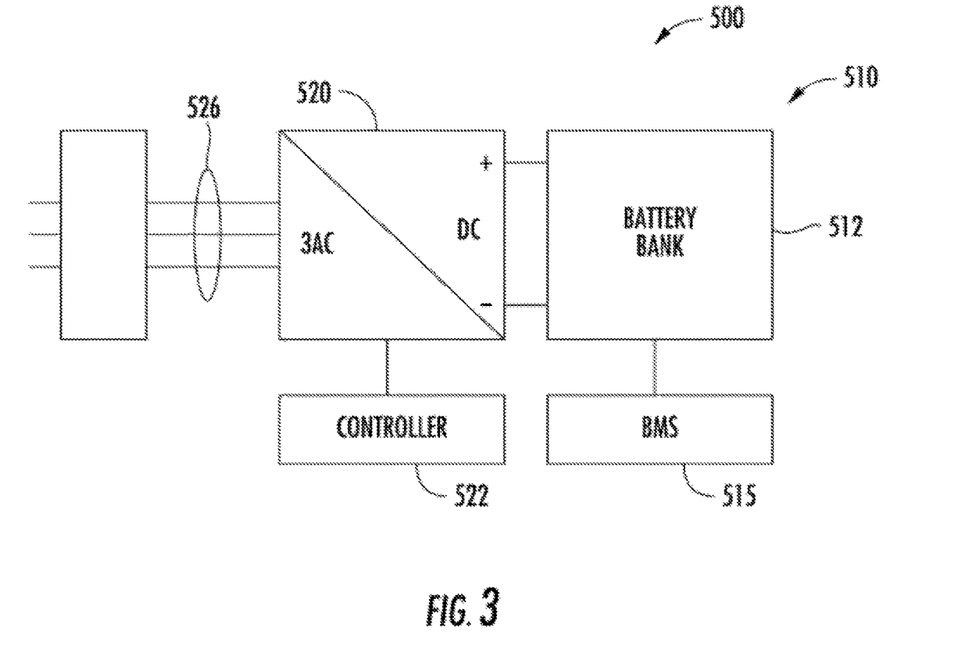
FIG. 3 depicts an example energy storage system according to example embodiments of the present disclosure.

As indicated, the power converters in accordance with example aspects of the present disclosure can be implemented in other energy systems, such as suitable energy storage systems. For instance, FIG. 3 depicts an example energy storage system 500 according to example aspects of the present disclosure. The energy storage system 500 can be a standalone power generation system or can be implemented as part of a renewable energy system, such as wind farm or solar farm.

The energy storage system 500 can include a battery energy storage system (BESS) 510. The BESS 510 can include one or more battery energy storage devices 512, such battery cells or battery packs. The battery energy storage devices 512 can contain one or more sodium nickel chloride batteries, sodium sulfur batteries, lithium ion batteries, nickel metal hydride batteries, other energy storage devices (e.g. capacitors, fuel cells, etc.), or other similar devices.

The BESS 510 can include a battery management system (BMS) 515. The BMS 515 can include one or more electronic devices that monitor one or more of the battery energy storage devices 512, such as by protecting the battery energy storage device from operating outside a safe operating mode, monitoring a state of the battery energy storage device, calculating and reporting operating data for the battery energy storage device, controlling the battery energy storage device environment, and/or any other suitable control actions. For example, in several embodiments, the BMS 515 is configured to monitor and/or control operation of one or more energy storage devices 512. The BMS 515 can be, for example, a logic controller implemented purely in hardware, a firmware-programmable digital signal processor, or a programmable processor-based software-controlled computer.

The BESS 510 can be coupled to a power converter 520. The power converter 520 can correspond to the power converter 120 depicted in FIG. 2. In this manner, the power converter 520 can include one or more electronic switching devices (e.g. SiC MOSFETs, IGBTs, etc.), and can be configured to convert a LV DC power to a MV AC power and vice versa. The power converter 520 can be configured to provide the MV AC power on a line bus 526 of the energy storage system 500. In particular, the power converters 120 and 520 will be discussed in greater detail with respect to FIG. 4.

The energy storage system 500 can also include a controller 522 that is configured to monitor and/or control various aspects of the energy storage system 500. For instance, the controller 522 can control the switching devices of the power converter 520 (e.g. using pulse width modulation) to charge or to discharge the battery energy storage system 510. In addition, the electronic switching elements can be controlled to condition DC power received or provided to the BESS 515. In accordance with various embodiments, the controller 522 can be a separate unit (as shown) or can be part of the BMS 515 of the BESS 510.

Figure 4:
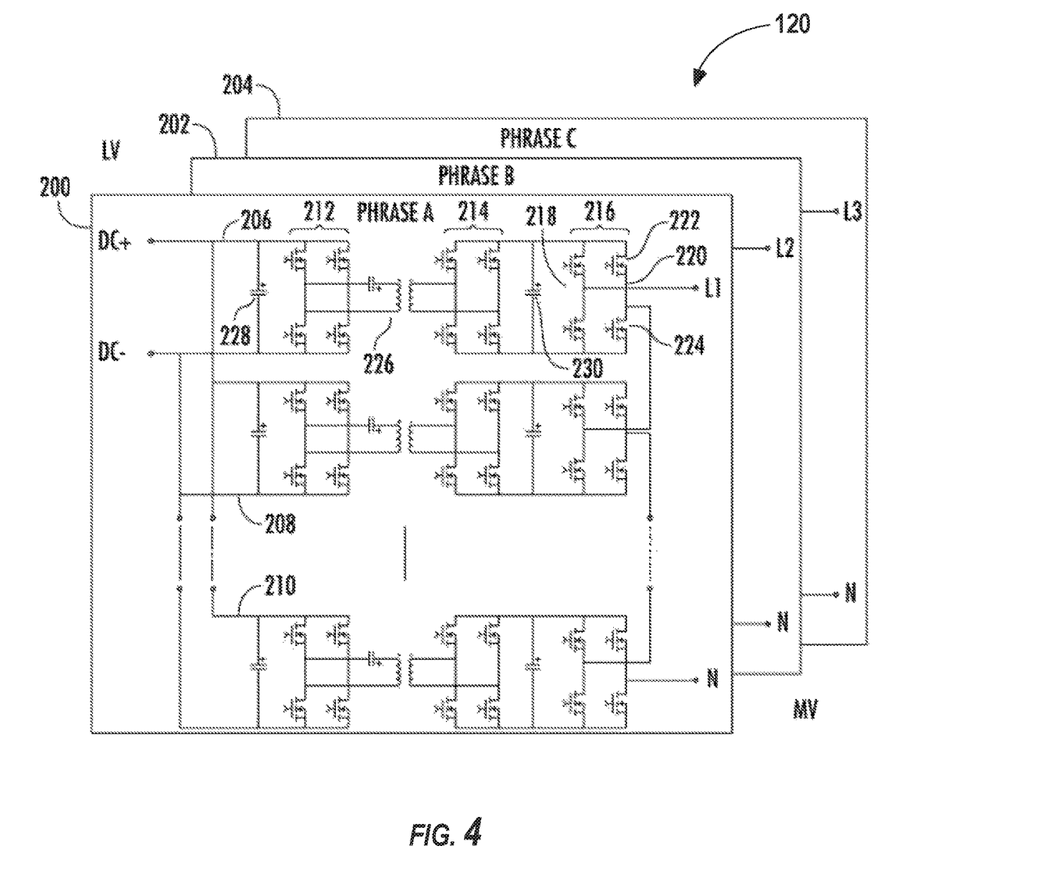
FIG. 4 depicts an example power converter according to example embodiments of the present disclosure.

FIG. 4 depicts an example power converter 120 according to example embodiments of the present disclosure. For instance, the power converter 120 can be a DC-DC-AC converter. In some implementations, the DC-DC portion of the power converter 120 can be a resonant converter. As shown, the power converter 120 includes conversion module 200, conversion module 202, and conversion module 204. The conversion modules 200-204 can be configured to receive a LV DC power from the PV array(s) 110, and to convert the LV DC power to a MV AC power for feeding to the AC power system. Each conversion module 200-204 is associated with a single phase of three-phase output AC power. In particular, conversion module 200 is associated with the phase A output of the three-phase output power, conversion module 202 is associated with the phase B output of the three-phase output power, and conversion module 204 is associated with the phase C output of the three-phase output power.

Each conversion module 200-204 includes a plurality of module branches. For instance, as shown, conversion module 200 includes module branch 206, module branch 208, and module branch 210. Each module branch 206-210 comprises a plurality of conversion entities. For instance, module branch 206 includes conversion entity 212, conversion entity 214, and conversion entity 216. Each conversion entity 212-216 can include a plurality of bridge circuits coupled in parallel. For instance, conversion entity 216 includes bridge circuit 218 and bridge circuit 220. As indicated, each bridge circuit can include a plurality of switching devices coupled in series. For instance, bridge circuit 220 includes an upper switching device 222 and a lower switching device 224. The switching devices can be SiC MOSFET switching devices. As shown, each module branch 206-210 further includes an isolation transformer 226. The isolation transformer is coupled to conversion entity 212 and conversion entity 214. As shown, the conversion branches further include capacitors 228 and 230.

The power converter 120 can be a bidirectional power converter. The power converter 120 can be configured to convert a LV DC power to a MV AC power and vice versa. For instance, when providing power to the AC power system, the power converter 120 can be configured to receive a LV DC power from the DC link 136 on a LV side of the power converter 120, and to output a MV AC power on a MV side of the power converter 120. The module branches 206-210 can be coupled together in parallel on the LV side and can be coupled together in series on the MV side.

In one particular example implementation, when providing power to the AC power system, the conversion entity 212 can be configured to convert the LV DC on the DC link 136 to a LV AC power. The isolation transformer 226 can be configured to step the LV AC power up to a MV AC power. The conversion entity 214 can be configured to convert the MV AC power to a MV DC power. The conversion entity 216 can be configured to convert the MV DC power to a MV AC power suitable for provision to the electric grid 184.

The module branches 206-210 can be configured to contribute to the overall MV AC power provided by the conversion module 200. In this manner, any suitable number of module branches can be included within the module branches 206-210. As indicated, each conversion module 200-204 is associated with a single phase of output power. In this manner, the switching devices of the conversion modules 200-204 can be controlled using suitable gate timing commands (e.g. provided by one or more suitable driver circuits) to generate the appropriate phase of output power to be provided to the electrical grid. For example, the controller 174 can provide suitable gate timing commands to the gates of the switching devices of the bridge circuits. The gate timing commands can control the pulse width modulation of the IGBTs to provide a desired output.

Figure 5:
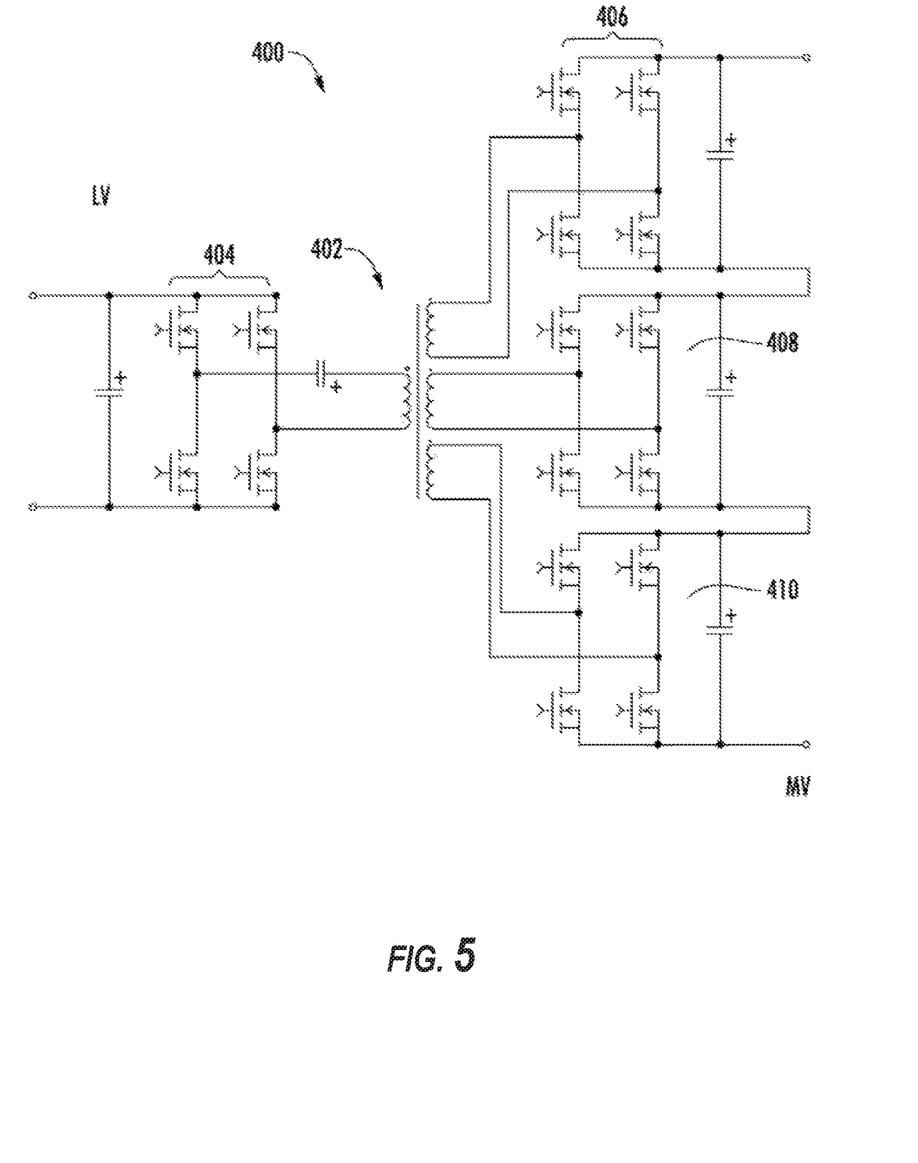
FIG. 5 depicts an example converter according to example embodiments of the present disclosure.

FIG. 5 depicts an alternative converter 400 according to example embodiments of the present disclosure. In particular, converter 400 can be configured to convert a LV DC to a HV DC and vice versa. In this manner, the converter 400 can be a DC-DC resonant converter. In some implementations, the converter 400 can correspond to DC-DC portion of the DC-DC-AC power converter 120 depicted in FIG. 4. The converter 400 can be implemented within a conversion module, as described with regard to FIG. 4. For instance, the power converter 400 can correspond to conversion entities 212 and 214, and the corresponding conversion entities on module branches 208 and 210 depicted in FIG. 4. As shown, the power converter 400 includes a multi-winding transformer 402. The transformer 102 includes a single winding on a LV side of the converter 400 and multiple windings on a MV voltage side of the converter 400. The number of windings on the multiple winding side of the transformer 402 can correspond to a number of module branches to be included in the corresponding conversion module.

As shown, a single conversion entity 404 can be implemented on the LV side of the converter 400. The conversion entity 404 can be coupled to the single winding on the LV side of the transformer 400. The conversion entity 404 can be configured to convert a LV DC power to a LV AC power. The transformer 402 can be configured to step the LV AC power up to a MV AC power and to provide the MV AC power on each winding of the multiple winding side of the transformer 402. In particular, each winding on the multiple winding side of the transformer 402 can be coupled to a conversion entity (e.g. conversion entities 406-410). The conversion entities 406-410 can be configured to convert the MV AC power to a MV DC power, and to provide the MV DC power to respective other conversion entities for a conversion of the MV DC to a MV AC suitable for provision to a grid.

Figure 6:
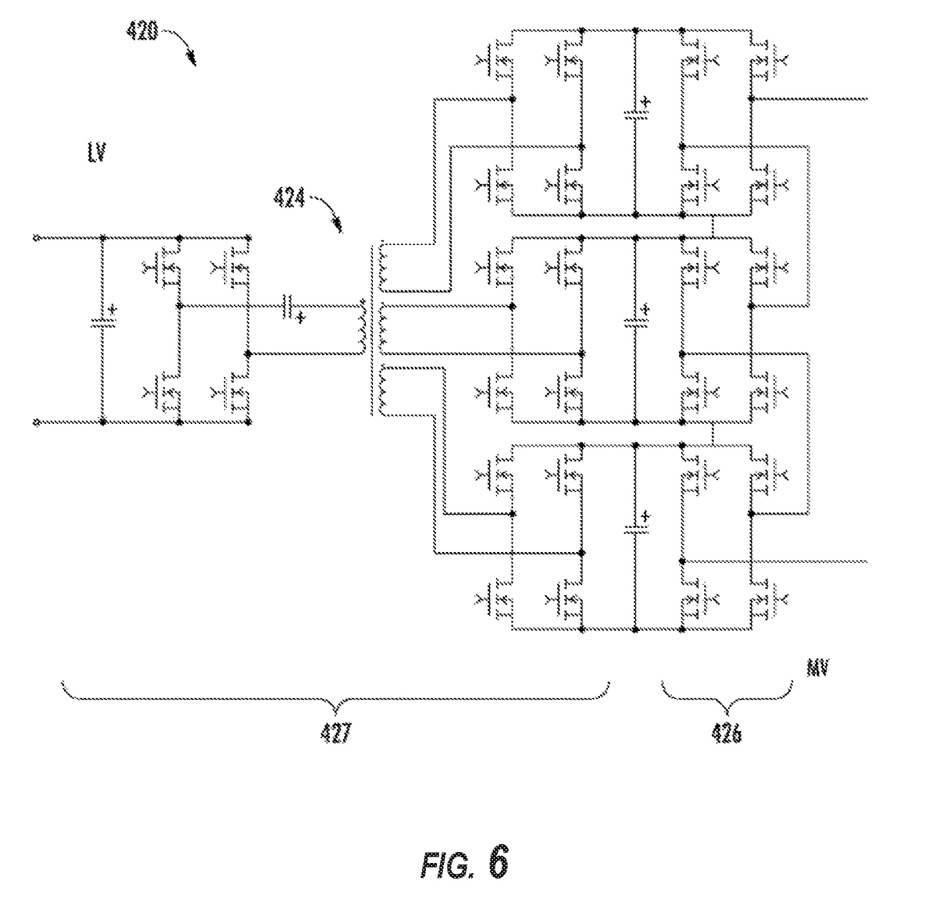
FIG. 6 depicts an example power converter according to example embodiments of the present disclosure.

FIG. 6 depicts an example power converter 420 according to example embodiments of the present disclosure. Power converter 420 can be implemented within various suitable energy systems, such as solar power generation system 100, energy storage system 500 and/or other suitable energy system. For instance, the power converter 420 can correspond to the power converter 120 depicted in FIG. 4. In this manner, the power converter 420 can be a DC-DC-AC power converter.

As shown, a DC-DC portion 422 of the power converter 420 can correspond to converter 400 depicted in FIG. 5. In this manner, the DC-DC portion 422 can include a multi-winding transformer 424 having a single winding on a LV side of the power converter 420 and multiple windings (e.g. three windings) on a MV side of the power converter 420. The DC-DC portion 422 can be configured to convert a LV DC power to a MV DC power, and to provide the MV DC power to a DC-AC portion 426 of the power converter 420. The DC-AC portion 426 can convert the MV DC power to a MV AC power suitable for feeding to an AC power system.

The topologies of the converters 400 and 420 depicted in FIGS. 5 and 6 can facilitate a reduction in the number of transformers used relative to the topology of the power converter 120 depicted in FIG. 4. Further, the topologies of the converters 400 and 420 can facilitate a reduction in the number of switching devices used relative to the topology of the power converter 120 depicted in FIG. 4.

Although specific features of various embodiments may be shown in some drawings and not in others, this is for convenience only. In accordance with the principles of the present disclosure, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An energy system comprising:
 an input power source configured to provide a low voltage direct current power; and
 a power converter comprising a plurality conversion modules, each conversion module comprising,
 a first conversion entity configured to convert the low voltage direct current power to a low voltage alternating current power, the first conversion entity comprising a first bridge circuit, the first bridge circuit comprising a plurality of silicon carbide switching devices coupled in series;

an isolation transformer configured to step the low voltage alternating current power up to a medium voltage alternating current power;

a plurality of second conversion entities configured to convert the medium voltage alternating current power to a medium voltage direct current power, each second conversion entity of the plurality of second conversion entities comprising-a plurality of second bridge-circuits coupled in parallel, each second bridge circuit of the plurality of second bridge circuits comprising a plurality of silicon carbide switching devices coupled in series; and a plurality of third conversion entities each configured to provide a single phase of the medium voltage multi-phase alternating current output power on a line bus of the energy system.

2. The energy system of claim 1, wherein a first, single winding of the isolation transformer is coupled to the first bridge circuit.

3. The energy system of claim 1, wherein the isolation transformer comprises a single winding on a low voltage side and a plurality of windings on a medium voltage side of the isolation transformer.

4. The energy system of claim 3, wherein each winding on the medium voltage side of the multi-winding isolation transformer is coupled to a second conversion entity of the plurality of second conversion entities.

5. The energy system of claim 4, wherein the single winding on the low voltage side of the isolation transformer is coupled to the first conversion entity.

6. The energy system of claim 1, wherein each second conversion entity of the plurality of second conversion entities comprises one or more module branches.

7. The energy system of claim 6, wherein the first conversion entity comprises two or more module branches, and wherein the two or more module branches are coupled together in parallel; and wherein each second conversion entity comprises two or more module branches, and wherein the two or more mode branches are coupled together in series on a medium voltage side of the conversion module.

8. The energy system of claim 1, wherein the energy system is an energy storage system, and wherein the input power source comprises one or more energy storage devices.

9. The energy system of claim 1, wherein the energy system is a solar power generation system, and wherein the input power source comprises one or more photovoltaic arrays.

10. The energy system of claim 1, wherein the power converter is a bidirectional power converter.

11. A power converter for use in an energy system, the energy system comprising an input power source configured to provide a low voltage direct current power, the power converter comprising:
a plurality of conversion modules, each conversion module comprising,
a first conversion entity configured to convert the low voltage direct current power to a low voltage alternating current power, the first conversion entity comprising a first bridge circuit, the first bridge circuit comprising a plurality of silicon carbide switching devices coupled in series;

an isolation transformer configured to step the low voltage alternating current power up to a medium voltage alternating current power;

a plurality of second conversion entities configured to convert the medium voltage alternating current power to a medium voltage direct current power, each second conversion entity of the plurality of second conversion entities comprising-a plurality of second bridge-circuits coupled in parallel, each second bridge circuit of the plurality of second bridge circuits comprising a plurality of silicon carbide switching devices coupled in series; and a plurality of third conversion entities each configured to provide a single phase of the medium voltage multi-phase alternating current output power on a line bus of the energy system.

12. The power converter of claim 11, wherein a first, single winding of the isolation transformer is coupled to the first bridge circuit.

13. The power converter of claim 11, wherein the isolation transformer comprises a single winding on a low voltage side and a plurality of windings on a medium voltage side of the isolation transformer.

14. The power converter of claim 13, wherein each winding on the medium voltage side of the multi-winding isolation transformer is coupled to a second conversion entity of the plurality of second conversion entities.

15. The power converter of claim 14, wherein the single winding on the low voltage side of the isolation transformer is coupled to the first conversion entity.

16. The power converter of claim 11, wherein each second conversion entity of the plurality of second conversion entities comprises one or more module branches.

17. The power converter of claim 16, wherein the first conversion entity comprises two or more module branches, and wherein the two or more module branches are coupled together in parallel; and wherein each second conversion entity comprises two or more module branches, and wherein the two or more mode branches are coupled together in series on a medium voltage side of the conversion module.

18. The power converter of claim 11, wherein the energy system is an energy storage system and the input power source comprises one or more energy storage devices.

19. A power conversion system comprising:
a plurality of conversion modules, each conversion module comprising,
a first conversion entity configured to convert low voltage direct current power to a low voltage alternating current power, the first conversion entity comprising a first bridge circuit, the first bridge circuit comprising a plurality of silicon carbide switching devices coupled in series;

an isolation transformer configured to step the low voltage alternating current power up to a medium voltage alternating current power;

a plurality of second conversion entities configured to convert the medium voltage alternating current power to a medium voltage direct current power, each second conversion entity of the plurality of second conversion entities comprising a plurality of second bridge-circuits coupled in parallel, each second bridge circuit of the plurality of second bridge circuits comprising a plurality of silicon carbide switching devices coupled in series; and a plurality of third conversion entities each configured to provide a single phase of the medium voltage multiphase alternating current output power of the power conversion system suitable for storage at an energy storage system.

20. The power conversion system of claim 19, wherein the power conversion system is coupled to the energy storage system.

* * * * *

UNITED STATES PATENT AND TRADEMARK OFFICE
CERTIFICATE OF CORRECTION

PATENT NO. : 10,411,473 B2
APPLICATION NO. : 15/399001
DATED : September 10, 2019
INVENTOR(S) : Robert Gregory Wagoner et al.

It is certified that error appears in the above-identified patent and that said Letters Patent is hereby corrected as shown below:

In the Drawings

Sheet 3, Fig. 4, the entire figure should be illustrated as shown on the attached drawing sheet, with extraneous lines below reference numeral 212 removed.

Signed and Sealed this
Twenty-eighth Day of June, 2022

Katherine Kelly Vidal
*Director of the United States Patent and Trademark Office*